United States Patent [19]

Takamura et al.

[11] Patent Number: 5,498,163

[45] Date of Patent: Mar. 12, 1996

[54] FLUID/ELECTRICAL ROTARY JOINT

[75] Inventors: Zenichi Takamura; Yuji Yano, both of Futtu; Yasuo Sato, Kashiwa, all of Japan

[73] Assignee: Kuroda Precision Industries, Ltd., Japan

[21] Appl. No.: 235,940

[22] Filed: Apr. 29, 1994

[30] Foreign Application Priority Data

Apr. 30, 1993 [JP] Japan ................. 5-28544 U

[51] Int. Cl.[6] ................................................ H01R 39/00
[52] U.S. Cl. ........................... 439/13; 439/190; 439/207
[58] Field of Search ................................ 439/190–195, 439/13, 21–28, 207–211

[56] References Cited

U.S. PATENT DOCUMENTS

| 2,135,835 | 11/1938 | Papello | 439/164 |
| 2,424,650 | 7/1947 | Dickerman | 439/24 X |
| 2,725,540 | 11/1955 | Scott | 439/21 X |
| 4,392,698 | 7/1983 | Mellott | 439/190 X |

*Primary Examiner*—Khiem Nguyen
*Attorney, Agent, or Firm*—Klima & Hopkins

[57] ABSTRACT

A composite rotary joint for both fluid and electrical connections particularly suitable for application with a rotary table. The rotary joint provides a substantially more compact and serviceable arrangement than existing rotary joints.

7 Claims, 3 Drawing Sheets

FLUID/ELECTRICAL ROTARY JOINT

FIELD OF THE INVENTION

This invention relates to a rotary joint involving both fluid and electrical aspects. Specifically, the rotary joint according to the present invention comprising a fluid or hydraulic rotary joint portion including one or more compressed air or oil connections or lines for performing work, and an electrical rotary joint portion including one or more electrical connections or lines. The rotary joint according to the present invention can be used for such applications as a wrist for a robotics arm for accommodating both fluid and control signal lines; an automatic painting device for accommodating both paint and control signal lines; and production equipment for automated processes or automated assembly devices for accommodating grinding oil, hydraulic drive fluid and other working fluids, as well as control signal lines or a welding cable.

BACKGROUND OF THE INVENTION

An example of a device to be used in specialized production or assembly machines is disclosed in Japanese Utility Model Kokoku-Kohou 60-17249. In this device, a fixed member pivotally supports the rotary shaft of a table that can freely rotate. This fixed member can easily supply drive fluid, electrical power, or signals to any device seated on the rotary table. For this purpose, a composite rotary joint is mounted on the aforesaid rotary shaft. This joint has the combined ability to carry fluids and connect electrical wiring. Through this composite rotary joint, the aforementioned working fluid and electricity can easily be supplied to operating actuators or control devices seated on the rotary table.

A brief explanation of a prior art device with reference to FIG. 3 is as follows. FIG. 3 shows a joint used in an automatic painting device with a multi-system paint circuit. This device requires three (3) systems including electrical wiring, a compressed air line, and a paint line for the spray gun.

In this prior art device, the main shaft 100 accommodates two separate pipes inside so that it is divided into two portions lengthwise. The air hose 116 is connected to an internal pipe 113 via rotary joint 112 on the lower end of portion 101 of the main shaft 100. On the other end of shaft portion 101 are the necessary number of air outlets 115, 115'.

The control circuit wiring 125 is run through the hollow outer portion 110 of bisected shaft 101 by way of current collector 119, which is fitted onto outer pipe 109 of rotary joint 112. An opposite end of the wire 125 extends through hole 108 located at the opposite end of shaft portion 101.

The wiring 125 is connected to solenoid valve 117 on circuit 121a, which is the circuit for various air distribution pipes furnished on rotary table 120. The air circuit 121a also connects through the exit tube 121b of the solenoid valve 117 to a spray gun (not pictured) on the rotary table 120.

A hose 126 for liquids is connected to central pipe 113 through rotary joint 114, which is located on the top end of a shaft portion 102 of the divided main shaft portion 100. The shaft portion 102 is located directly on top of the other shaft portion 101. On outer pipe 129 of the divided shaft is a casing 128 furnished with a ball bearing 127. The casing 128 is hermetically sealed by means of packing to seal rotary joint 130. The casing 128 on the rotary joint 130 has an inlet pipe 131 for accommodating paint, through which paint is supplied to air passage 107 in the main shaft.

The necessary number of exit holes 122 and 123 are provided for two separate paint systems in the divided main shaft 100. The paint pipes 124 connect these holes to the spray gun (not pictured) on rotary table 120. A drive motor 106 supplies rotary force to the main shaft 100 via sprockets 105.

In this prior art device, the wiring connection unit comprises a current collector (i.e. a rotary electrical joint) defined by rings surrounding the main shaft 100. As a result, the effective working area on the rotary table is diminished. The sprockets which supply rotation to both the table and the shaft, the current collector and the rotary joint to conduct pressurized air must all be arranged along the length of the shaft. In other words, the three aforementioned components must be arranged on the main shaft one atop the other, separated by tables serving to immobilize them. Inevitably, then, the device must have a high profile, and tends to be relatively large.

If the fixed table supporting the main shaft is positioned above the shaft, and the table which rotates with the shaft is positioned below the shaft, the arrangement of the pipes and wiring, installation and maintenance all become complicated, and the device becomes even larger.

SUMMARY OF THE INVENTION

An object of the present invention is to provide an improved rotary joint for accommodating both electrical and fluid lines or connections.

Another object of the present invention is to provide an improved rotary joint having a low profile, and is small and compact.

A further object of the present invention is to provide a rotary joint having a larger effective workspace available on the rotary table on which the rotary joint is installed, and in which all operations which must be performed with respect to the rotary table including laying pipe, running wiring, and installing and maintaining the table are simplified.

The rotary joint according to the present invention comprises at least one part of a rotary shaft, which has a hollow portion running along its length, and is fitted into the interior of the body in such a way that it is free to rotate. The body which is located on one end of the rotary shaft C is extended in the form of a tube over the rotary joint, which is to be used for the electrical wiring connections. The rotary joint is fitted into the interior of a tubular extension.

The second distinguishing feature of the rotary joint according to the present invention is that the wiring connection terminal on the rotary joint faces a hollow portion in the shaft from which it is separated by a hollow insulation element. The wiring cable, which is connected to the connection terminal runs through the hollow portion in the shaft C, and outlet holes for the cable are provided on the opposite end of the rotary shaft. The hollow insulation element is preferably a electrical insulation element.

The third distinguishing feature is that a fluid conduit, which is connected to the fluid supply inlet in the body 1 is provided in the interior of the rotary shaft C, and an outlet for the said conduit is provided on the other end of rotary shaft.

It is desirable that the aforesaid rotary shaft be fixed on the center line with respect to the rotation of rotary table, and that the rotary shaft be so constructed as to be able to rotate as one with the rotary table.

The aforesaid rotary table may serve for the placement of operating devices, which are operated by fluid supplied by way of fluid conduit outlet, and electrical device to which is connected, which exits the rotary shaft through an outlet. The table is not limited to use as a rotary table in production machines for automated processes or automated assembly machines. It can also be employed in the wrist of a robotics armor in an automatic painting device, or in other applications.

It is further desirable that the hollow portion in the rotary shaft run along the axis of that shaft, and that the fluid conduit run inside shaft parallel to the axis.

A device to connect fluid to the conduit in the rotary shaft with the fluid supply inlet in the body can easily be achieved in the following way. An annular bushing is attached to the inside of the body facing fluid supply inlet. The rotary shaft is inserted into the bushing in such a way that it can rotate freely. A fluid entry conduit is provided where the shaft engages with the bushing. This conduit runs from the fluid supply inlet to the fluid conduit inside the rotary shaft.

According to this invention, a rotary shaft with a hollow chamber running along its length is attached, in such a manner that it can rotate freely, to the interior wall of a body which is fixed in place. One end of the body to which the rotary shaft is attached is extended to form a tubular housing. Into the said tubular housing is fitted a rotary joint for the connection of electrical wiring. One of the connection terminals of the joint faces the hollow chamber of the said shaft from which it is separated by a hollow insulating element. The cable connected to the terminal is run through the hollow chamber of the shaft. An outlet hole for the cable is provided on the opposite end of the rotary shaft. This completes the description of the rotary joint mechanism for electrical wiring cable.

The rotary joint mechanism for fluids has the following configuration. The rotary shaft is fitted into the body in such a way that it can rotate freely. A fluid conduit connected to a fluid supply inlet on the body is provided in the interior of the rotary shaft. An outlet for the fluid conduit is provided on the opposite end of the rotary shaft.

With this configuration, then, the rotary joint mechanism for fluids and that for electrical wiring cable are both enclosed within a body which is maintained in a fixed position. The device has a simple design, the surface area it occupies is small, it has a low profile, and it is compact.

With this composite rotary joint, both the rotary joint mechanism for fluids and that for electrical wiring are built into the interior of the body as a single entity. This makes more space available on the rotary table, which enables it to be used for a device with multiple electrodes and sensors, such as a control device for serial or parallel conversion and transmission. In order that all operations which must be performed in the assembly of the rotary table, including electrical connection, installation, and service, can be carried out easily, the effective work space on the rotary table has been increased. All operations performed in the assembly of the rotary table including laying pipe, running wire, and installing and servicing the table, are simpler to accomplish. Various other positive effects are also achieved.

DETAILED DESCRIPTION OF PREFERRED EMBODIMENTS

Figure 1:
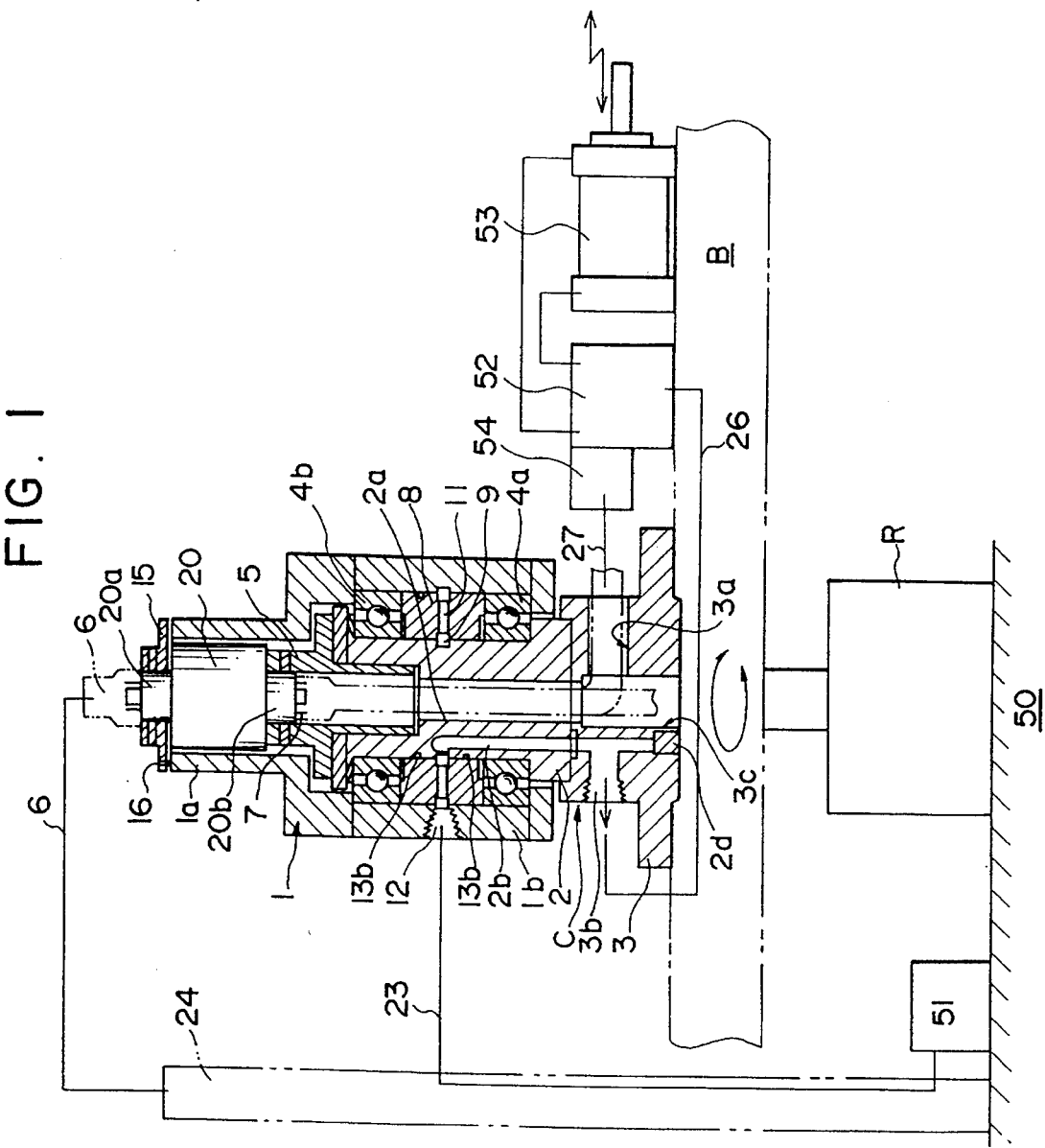
FIG. 1 is a cross-sectional view showing the principal components of an operating device in which a composite rotary joint device according to this invention is installed on the center line of a rotary table rotated by a motor or other drive device.
Figure 2:
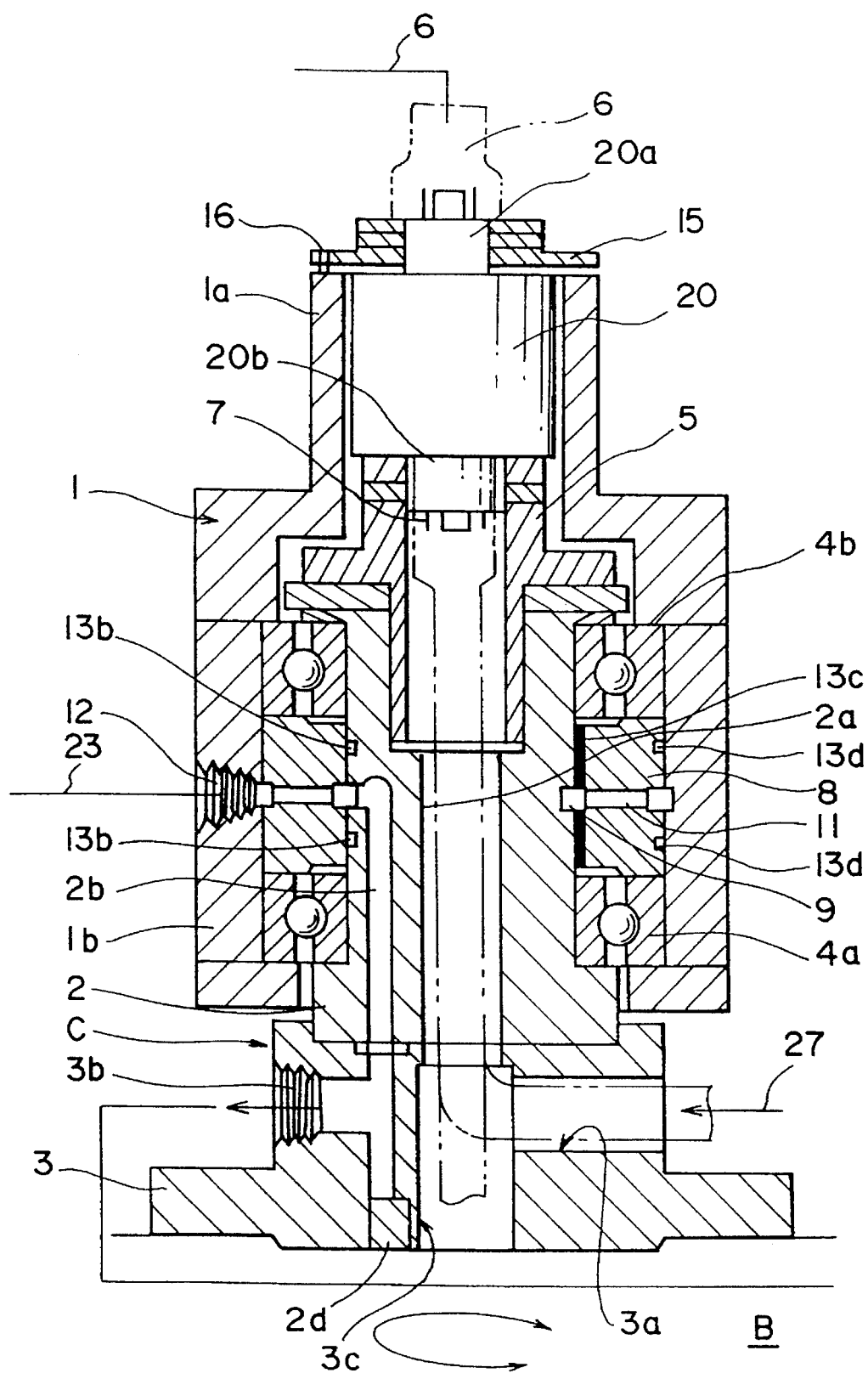
FIG. 2 is a enlarged sectional view of the composite rotary joint device according to this invention.
Figure 3:
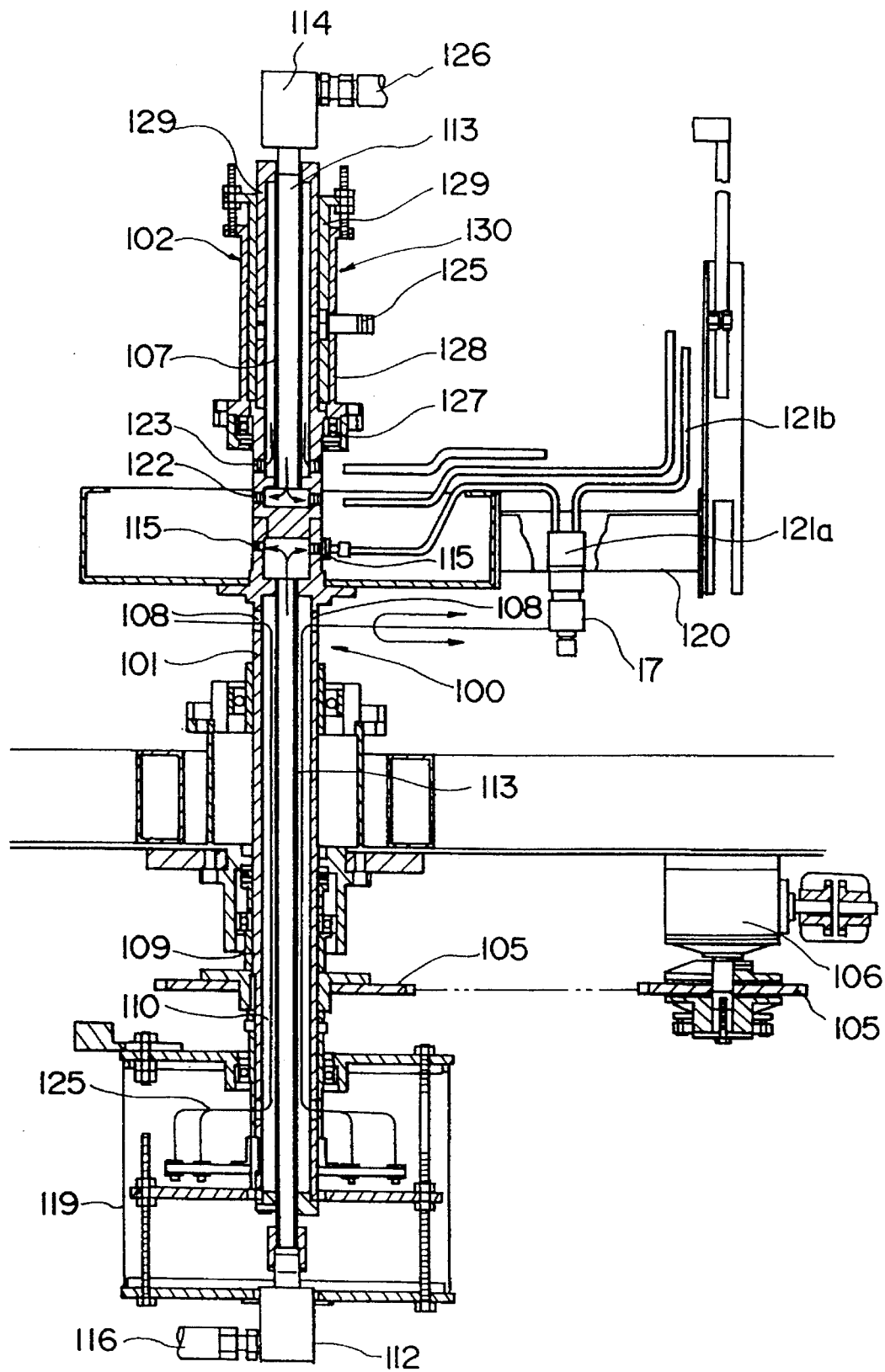
FIG. 3 is a cross-sectional view showing the principal components of a prior art composite rotary joint, which is used in an automatic painting device with circuits for multiple paint systems.

A detailed explanation of a preferred embodiment of this invention with reference to FIG. 1 and 2 is as follows. Insofar as the dimensions, materials, shape, and relative position of the structural components described in this embodiment are not specifically disclosed, they are not meant to limit the scope of this invention, but are offered merely for the sake of example.

This embodiment is a work device in which the composite rotary joint device A according to the present invention is installed on the central axis of a rotary table B, which is rotated by a motor or other drive device R.

A pipe 23 through which fluids are supplied from the exterior, and electrical wiring cable 6 are connected to body 1 of the rotary joint device A. The fluids delivered through pipe 23 and the signal carried through electrical wiring cable 27 are supplied to solenoid 54 located on rotary table B, electromagnetic control valve 52, and actuator 53, by way of body 2, which covers the main shaft of the rotary joint device A, and rotary head 3, which comprises body 2 and rotary shaft C.

In this embodiment, compressed air is used as the fluid which controls electromagnetic control valve 52. A source 51 is provided for supplying the air used for control, and is installed on the fixed substrate 50. The source 51 is connected to fluid supply inlet 12 on body 1 by way of fluid supply pipe 23.

A control box 24 is installed on fixed substrate 50. Electrical wiring cable 6, which emerges from the box 24 is connected to multi-electrode slip ring-type connector 20. The slip ring-type connector 20 engages with skirting 1a on the upper end of body 1. Electromagnetic control valve 52 (hereafter, "electromagnetic valve") is connected to the solenoid 54 and actuator 53. The actuator 53 is operated by the electromagnetic valve 52, and are all installed on rotary table B.

The electromagnetic valve 52 is made to open and close by signal received through electrical wiring cable 27, which exits from rotary head 3 with the assistance of solenoid 54. When electromagnetic valve 52 opens or closes, the supply of fluid to actuator 53 through pipe 26a is enabled or prevented, and piston 53a of actuator 53 advances or falls back.

The rotary table B, on which these various components are mounted, is joined to drive shaft R1 of drive device R. The drive device R is installed on fixed board 50. The table B is so constructed that it is able to rotate at a specified r.p.m.

The configuration of joint device A will be discussed in detail as follows.

The body 1 is fixed in place so that it cannot rotate. The body 1 comprises a tubular housing 1b, which houses rotary shaft 2 on annular bearings 4a and 4b. The body 1 further comprise tubular skirting 1a, which is mounted on the upper portion of the housing 1b in such a way as to be concentric therewith.

The rotary shaft 2 is fitted inside tubular housing 1b with the assistance of a shaft support consisting of annular bearings 4a and 4b, which are provided on the upper and lower portions, respectively, of the interior of housing 1b. The rotary shaft 2 is fixed to the center of the rotary table B through rotary head 3, which is firmly attached to the lower end of the shaft. When table B rotates, rotary head 3 and rotary shaft 2 rotate as one with the table B. Since rotary shaft 2 is supported within body 1 by bearings 4a and 4b, it is free to rotate while body 1 remains in a fixed position.

Between bearings 4a and 4b on the interior surface of the tubular housing 1b is pressed annular bushing 8. On the upper and lower portions of the outer surface of rotary shaft 2, facing the inside of the said bushing 8, are two O rings 13b, 13b, which provide a liquid-proof seal. O rings 13b, 13b prevent scoring on the inner surface of bushing 8 and insure that the shaft 2 can rotate. The said bushing 8 can be O ring member as an alternative. As shown in the right half of the FIGS. 1 or 2, another alternative is that metal seal member 13c can be used on the inner surface of the bushing 8, and O ring 13d can be used on the outer surface.

An annular groove 9 is provided on the inner surface of the bushing 8 located between O rings 13b, 13b, and on the portion of the outer surface of the shaft 2 which engages with the bushing. The inner groove 9 communicates with fluid conduit 2b in the rotary shaft 2. The inner groove 9 communicates with fluid supply inlet 12 in body 1 by way of fluid opening 11, which is provided in bushing 8.

The tubular skirting 1a has a wide segment and a narrow segment. The wide segment has the same diameter as tubular housing 1b and the narrow segment, which houses multi-electrode connector 20, sits above the wide segment and is concentric therewith. The tubular multi-electrode connector 20 is fitted inside the narrow segment of the tubular skirting 1a.

The multi-electrode cable connector 20 has two connector elements 20a and 20b. The multi-electrode connector element 20a is the lead-in connector element located on the upper end of the connector 20, and the connector element 20b is the lead-out connector element on the lower end of the multi-electrode cable connector 20. The two are connected via internal slip rings (not pictured) so as to rotate relatively freely on their axis. This type of multi-electrode cable connector 20 with slip rings can be purchased in the marketplace, and is widely known and easily obtained (for example, a rotary connector made by MELCOTAC U.S.A.).

The electrical wiring cable 6, which comes out of box 24 is connected to the lead-in connector element 20a. The wiring cable 7, which is received in hole 2a, is connected to the lead-out connector element 20b. The multi-electrode cable connector is so constructed that the slip rings (not pictured) maintain electrical contact when lead-out element 20b rotates while lead-in element 20a remains immobile.

The upper surface of the multi-electrode cable connector 20 is fixed to the skirting 1a by flange 15 and pin 16, which prevent it from rotating.

Through hole 2a, into which is received the collected electrical wiring cables connected to multi-electrode 20, runs through the center of the rotary shaft 2 and rotary head 3 creating a continuous passageway through both shaft and head. Cable conduit 3a, which communicates with the through hole 2a, is provided on the side of rotary head 3.

An upper portion of the through hole 2a in rotary shaft 2 has a larger diameter. Insulating element 5, a hollow tube with a flange, engages with the outer periphery of the larger portion of rotary shaft 2. This arrangement prevents shorting of the electrically exposed portion of wiring cable 7, which is connected to lead-out connector element 20b, and provides electrical protection.

A fluid conduit 2b for compressed air used for control purposes runs parallel to and alongside the through hole 2a along the axis of the rotary shaft 2 and rotary head 3. Its lower end is hermetically sealed by cover 2d so that it is airtight. Fluid outlet 3b, the outlet for the fluid conduit 2b, is provided on the side of rotary head 3. The fluid outlet 3b is connected to fluid inlet 52a on electromagnetic valve 52 by fluid pipe 26.

As a result of this arrangement, fluid supply inlet 12 on body 1 and fluid conduit 2b in rotary shaft 2 function normally despite the rotation of shaft 2. This configuration constitutes a rotary joint device for the introduction of fluids.

With the arrangement described above, a rotary joint device to conduct fluids and one for cable connections are contained within body 1. The outlet hole 3a, through which cable 7 exits, and fluid outlet 3b are both on the peripheral surface of rotary table B.

With this embodiment, then, when drive device R is made to rotate, rotary table B and rotary shaft element C comprising rotary head 3 and rotary shaft 2 rotate as a single unit while body 1 remains in a fixed position.

The compressed air from source 51 which is used to perform work is conducted through supply pipe 23 into fluid supply inlet 12 on body 1. Through fluid opening 11 it is channeled into annular groove 9.

Since the area of engagement between the outer surface of rotary shaft 2 and the inner surface of bushing 8 is sealed by O rings 13b, 13b, no air can leak out. The rotary shaft element C rotates together with rotary table B, however, because fluid conduit 2b inside shaft 2 and fluid supply inlet 12 on the side of body 1 are always connected via the aforesaid annular grooves 9, the compressed air used for work is conducted without hindrance from annular grooves 9 to electromagnetic valve 52 or other fluid-operated devices by fluid conduit 2b, and the designated control operation can be performed. Likewise with the electrical wiring cable, cable 6 extending from control box 24 is connected to lead-in connector element 20a on multi-electrode connector 20, which is fitted into body 1. Thus, since body 1 remains in a fixed position the cable 6 does not become twisted.

The cable 7 extending from the lead-out element 20b, is inserted into through hole 2a. Electrical contact is maintained by slip rings (not pictured) between lead-in connector element 20a and lead-out connector element 20b when one portion of the connector rotates. Also, the aforementioned through hole 2a runs along the axis of rotary shaft element C. This design allows the aforementioned shaft 2 to rotate as a unit with shaft element C.

With the aforesaid rotary joint mechanism for the cable connection, the lead-in cable 6 and lead-out cable 7, which is received in through hole 2 in rotary shaft 2, can rotate freely relative to each other. This prevents difficulties in wiring, operating or service in rotary shaft element C.

Both the rotary joint mechanism to conduct fluids and that for cable connection are housed in body 1. This allows the device to have a compact design and increases the space available on rotary table B, so that devices with multiple electrodes or multiple sensors, such as control devices for serial or parallel conversion or transmission, can be used on it. This design also facilitates operations which must be performed on the rotary table, including running electrical wire, installing the table, and servicing it.

Although the fluid in the embodiment discussed above was compressed air used for control purposes, other liquids such as oil or water or gases other than air might alternatively be used without exceeding the scope of this invention.

Further, in this embodiment one fluid conduit 2b was provided in rotary shaft 2, however, two or more fluid conduits 2b might be provided with two or more fluid conduits 3b provided in a circumferential direction in rotary head 3 to communicate with conduits 2b. Similarly, an additional number of annular grooves 9 might be provided as needed to construct the necessary fluid conduits, and fluids might be distributed in a number of places. All of this would be included in the present invention.

What is claimed is:

1. A rotary joint device for accommodating both fluid and electrical connections between relative rotating apparatus, comprising:

a housing having a fluid supply port connecting to a fluid passageway through said housing;

a rotary shaft disposed within said housing, said rotary shaft having a fluid handling passageway extending along at least a portion of its length and connecting to a fluid exit port of said rotary shaft, said rotary shaft further including a center passageway extending along at least a portion of its length, said fluid handling passageway of said rotary shaft fluidly connecting said fluid passageway of said housing with said fluid exit port of said rotary shaft;

a shaft support mechanism supporting said housing on said rotary shaft for allowing relative rotation between said housing and said rotary shaft;

a shaft sealing arrangement for sealing said passageway through said housing with said fluid handling passageway of said rotary shaft for allowing relative rotation between said housing and said rotary shaft; and a rotary electrical connection provided in said housing for connecting a lead in electrical cable stationary relative to said housing to a lead out electrical cable rotating relative to said housing and received within said center passageway of said rotary shaft for allowing rotation between said housing and said rotary shaft, said rotary electrical connection having a rotational axis aligned with an axis of rotation between said housing and said rotary shaft.

2. A device according to claim 1, including an annular insulation portion isolating said rotary electrical connection accommodated by said housing from said rotary shaft.

3. A device according to claim 1, wherein said fluid outlet port of said rotary shaft is located at one end of said rotary shaft, and said rotary electrical connector is provided at an opposite end of said rotary shaft.

4. A device according to claim 1, including a rotary table fixed to said rotary shaft so that said rotary shaft rotates in unitary fashion with said rotary table, said rotary shaft is fixed on a center line with respect to a center of rotation of said rotary table.

5. A device according to claim 4, including one or more devices connected to said fluid exit port of said rotary shaft and installed on said rotary table, and one or more electrical devices connected to said lead out electrical cable and installed on said rotary table.

6. A device according to claim 1, wherein said fluid handling passageway in said rotary shaft extends parallel along an axis of said shaft.

7. A device according to claim 1, including an annular bushing located between said housing and said rotary shaft for allowing rotation therebetween, said annular bushing having a fluid passageway extending to an annular groove for fluidly connecting said fluid passageway of said housing with said fluid passageway through said rotary shaft for providing a fluid connection that accommodates rotating of said housing relative to said rotary shaft.

* * * * *